Patented Jan. 3, 1933

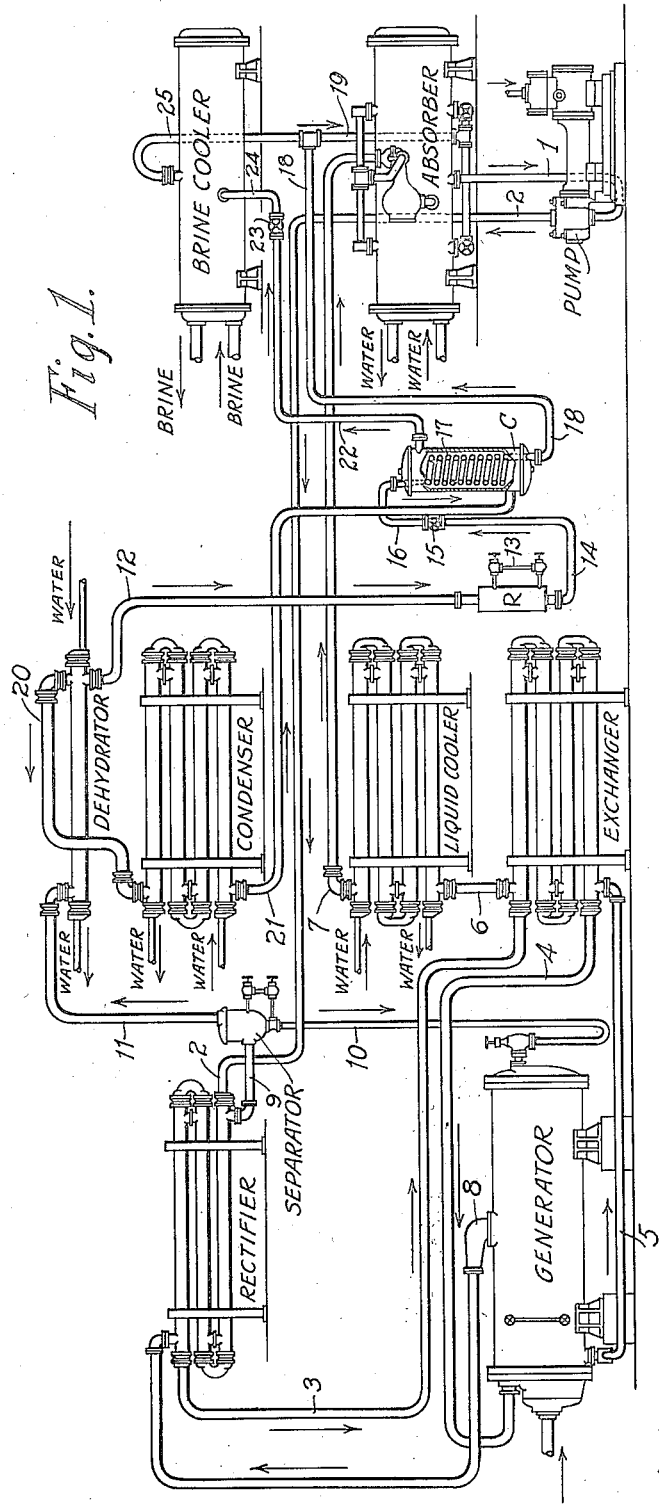

1,892,941

UNITED STATES PATENT OFFICE

PERCY CHARLES FREY, OF LOUISVILLE, KENTUCKY, ASSIGNOR TO HENRY VOGT MACHINE CO., OF LOUISVILLE, KENTUCKY, A CORPORATION OF KENTUCKY

REFRIGERATING APPARATUS OF THE ABSORPTION TYPE

Application filed May 5, 1932. Serial No. 609,485.

This invention relates to improvements in refrigerating apparatus of the absorption type.

In apparatus of this general character a suitable refrigerant, such as a solution of aqua ammonia, commonly termed "strong liquid", is pumped from the absorber through a rectifier and an exchanger into a generator where it is heated and thereby separated into a weak liquid and a gas. The weak liquid is successively cooled by passing it back through the exchanger in heat exchange relation with the strong liquid and thence through a cooler back into the absorber. The generated gas is passed through the rectifier in heat exchange relation with the strong liquid, where most of its moisture content is condensed, and thence through a separator where the gas and condensate are separated, the condensate passing by gravity back to the generator. Although the gas passing from the separator is generally termed "anhydrous gas", it, nevertheless, contains a slight amount of moisture. The present invention is directed to a method of and apparatus for treating this gas with its contained moisture.

Heretofore, the practice has been to condense this gas to form liquid ammonia and then to pass the liquid ammonia through an expansion valve into the brine cooler or evaporator where the ammonia gas boils off passing back to the absorber. Some or all of the moisture, however, accumulates in the brine cooler. Until recently it was thought that the moisture, in the form of water, settled in the bottom of the brine cooler and that it could, therefore, be purged out. It is now known that the moisture is distributed in the brine cooler throughout the liquid ammonia, and that it cannot, therefore, be thoroughly purged without completely emptying the contents of the brine cooler. Since the boiling point of aqua ammonia is higher than that of dry anhydrous ammonia, the accumulation of moisture in the brine cooler has, with a given absorber pressure, the effect of rendering necessary a corresponding increase in brine temperature if capacity is to be maintained, or, a corresponding reduction in capacity without any brine temperature change. However operated it will be necessary to purge the brine cooler at stated intervals.

It has been proposed to overcome this objection to a certain extent and to reduce the number of purging operations otherwise required by further dehydrating the gas before or after it leaves the separator and passing the condensate back to the generator or absorber. In dehydrating the gas a certain amount of ammonia is also condensed and under the practice proposed, the potential refrigerating effect of the condensed ammonia is lost.

The principal object of this invention is to obtain the benefits resulting from the dehydration of the gas without losing the potential refrigerating effect of the condensate formed by such dehydration.

Simply stated the invention consists in dehydrating the gas, expanding the condensate thus formed, condensing the dehydrated gas to form liquid ammonia and passing the liquid ammonia in heat exchange relation with the expended condensate. This method of treating the gas effects a further reduction in its temperature according to the refrigerating effect of the condensate, and it may, therefore, be passed through the expansion valve to the brine cooler, while the condensate can be returned to the absorber. One form of apparatus suitable for carrying out the invention is illustrated somewhat diagrammatically in Figure 1 of the accompanying drawing.

In the embodiment shown the pump draws the aqua ammonia, or strong liquid, from the absorber through a pipe 1 and forces it through pipe 2, rectifier, pipe 3, exchanger and pipe 4 into the generator. The rectifier, exchanger and generator all function to increase the temperature of the strong liquid, the liquid being separated in the generator into a weak liquid and a gas. The weak liquid passes from the generator through pipe 5, exchanger, pipe 6, liquid cooler and pipe 7 back to the absorber. The gas generated in the generator passes through pipe 8, rectifier, pipe 9 to the separator. In the separator the moisture condensed in the rectifier is separated from the gas and returned through pipe 10 to the generator. The gas leaving the separator is conducted through pipe 11 to a dehydrator where its temperature is further reduced so as to precipitate or condense most, if not all, of its remaining moisture content. A quantity of ammonia will incidentally be condensed with the moisture and the potential refrigerating effect of the condensate will depend upon the amount of ammonia contained in the condensate.

The dehydrator may utilize any cooling agency, such for example as water, the flow of which will be regulated by any suitable means not shown in order to produce a desired rate or degree of condensation. The condensate formed in the dehydrator is conducted through pipe 12 to a receiver R, which is provided with a suitable indicator or gauge 13 by which the amount of condensate in the receiver can be observed and from which the necessity for regulating the rate of condensation in the dehydrator can be determined. The condensate passes from the receiver R through the pipe 14, expansion valve 15, pipe 16, cooling coil 17 of the anhydrous liquid precooler C and pipes 18 and 19 back to the absorber.

It may be pointed out at this time that the dehydrator may be positioned before the separator either as a separate unit or as a part of the rectifier, and the entire condensate of both the rectifier and the dehydrator conducted to the receiver R and subsequently expanded, instead of the arrangements shown and described.

The anhydrous gas leaving the dehydrator is conducted through pipe 20 into the condenser where it is condensed into liquid form. Now, in order to recover the refrigerating effect of the moisture or hydrous condensate, the anhydrous condensate is conducted from the condenser through pipe 21 into the coil chamber of the anhydrous liquid precooler C where it is brought into heat exchange relation with the moisture condensate in the coil 17 and its temperature thereby correspondingly reduced. After passing through the precooler C, the anhydrous condensate is conducted through pipe 22, expansion valve 23 and pipe 24 into the brine cooler or evaporator. Here, of course, the gas boils off or evaporates passing through pipes 25 and 19 back to the absorber.

From the foregoing it will be apparent that this arrangement not only makes possible a substantial reduction of moisture accumulation in the brine cooler with a consequent reduction in the number of brine cooler purging operations required, but, in addition, accomplishes these results without any substantial loss in refrigerating effect.

Consequently it is possible to obtain capacity at extremely low temperatures with a higher absorber pressure or to operate the brine cooler, with a given absorber pressure, at a temperature lower than otherwise possible. Furthermore these results are obtained with but few inexpensive parts of simple arrangements which can be easily, quickly and inexpensively attached to present day equipment.

It should be understood that while the use of a solution of aqua ammonia has been mentioned as a refrigerant and water indicated as a cooling agency, it is not intended to limit the invention thereto, as other substances are also suitable.

Having described my invention I claim:

1. In an absorption refrigerating apparatus, a method of treating the gas after it leaves the generator, consisting in dehydrating the gas sufficiently to condense a substantial quantity of its moisture content, expanding the condensate resulting therefrom, condensing the dehydrated gas, and passing the gas condensate into heat exchange relation with the expanded moisture condensate.

2. In an absorption refrigerating apparatus, a method of treating a partially dehydrated gas consisting in further dehydrating the gas sufficiently to condense a substantial quantity of its remaining moisture content, expanding the condensate resulting therefrom, condensing the dehydrated gas and passing the gas condensate into heat exchange relation with the moisture condensate.

3. In an absorption refrigerating apparatus, the combination of a generator, means for dehydrating the gas from said generator sufficiently to condense a substantial quantity of its moisture content, means for expanding the hydrous condensate, means for condensing the anhydrous gas, and means for bringing the expanded hydrous condensate and the anhydrous condensate into heat exchange relation.

4. In an absorption refrigerating apparatus, the combination of a dehydrator arranged to receive and dehydrate partially dehydrated gas, means for expanding the hydrous condensate, means for condensing the anhydrous gas and means for bringing the expanded hydrous condensate and the anhydrous condensate into heat exchange relation.

5. In an absorption refrigerating apparatus, a dehydrator arranged to receive and dehydrate partially dehydrated gas, a receiver for the hydrous condensate resulting therefrom, an expansion valve for expanding the hydrous condensate passing from said receiver, means for condensing the anhydrous gas passing from said dehydrator and means for bringing the expanded hydrous condensate into heat exchange relation with the anhydrous condensate.

6. In an absorption refrigerating apparatus, a dehydrator arranged to receive and dehydrate partially dehydrated gas, a receiver for the hydrous condensate resulting therefrom, means associated with said receiver for indicating the quantity of hydrous condensate in said receiver, means for expanding the hydrous condensate passing from said receiver, means for condensing the anhydrous gas, and means for bringing the expanded hydrous condensate and the anhydrous condensate into heat exchange relation.

In testimony whereof I hereunto affix my signature this the 30th day of April, 1932.

PERCY CHARLES FREY.